United States Patent [19]

Martindale

[11] Patent Number: 4,844,134

[45] Date of Patent: Jul. 4, 1989

[54] APPARATUS FOR MAKING ROUGH-SIDED LUMBER FROM SURFACED LUMBER

[75] Inventor: Alan C. Martindale, Yamhill, Oreg.

[73] Assignee: Bur-Mar Industries, Inc., Forest Grove, Oreg.

[21] Appl. No.: 234,179

[22] Filed: Aug. 19, 1988

[51] Int. Cl.[4] ........................ B23B 3/28; B27C 5/00

[52] U.S. Cl. ........................ 144/2 R; 144/115; 144/361

[58] Field of Search ........................ 144/2 R, 115, 361

[56] References Cited

U.S. PATENT DOCUMENTS

| | | | |
|---|---|---|---|
| 3,495,638 | 2/1970 | Humphrey | 144/361 |
| 3,895,464 | 7/1975 | Kiser | 144/116 |
| 4,323,099 | 4/1982 | Bost | 144/116 |
| 4,712,596 | 12/1987 | McClaron | 144/361 |
| 4,732,184 | 3/1988 | Albright | 144/362 |

*Primary Examiner*—W. Donald Bray
*Attorney, Agent, or Firm*—Chernoff, Vilhauer, McClung & Stenzel

[57] ABSTRACT

An apparatus for creating a rough-sawn texture on all four sides of surfaced lumber has two pair of sleds which carry endless loop chains having roughening teeth projecting outwardly therefrom. The sleds have planar faces with slots extending across them that the roughening teeth project through, and in one pair of sleds the faces are oriented vertically and in the other pair the faces are oriented horizontally. One of the sleds in each pair is fixed on a frame which supports the apparatus and the other sled in each pair is slidably mounted in tracks. Thus the distance between the faces can be adjusted so that they abut the sides of a particular size piece of lumber. The chains are carried on sprockets that are mounted on the sled and are driven by motors so that the roughening teeth move across the piece of lumber being processed. The portion of the chains which passes over the lumber is supported in a guide assembly which is adjustable to ensure that the roughening teeth are centered in the slot and are cutting at the proper depth. The lumber is transported through the apparatus by a pair of pinch roller assemblies which also are adjustable to accommodate different size lumber.

22 Claims, 6 Drawing Sheets

APPARATUS FOR MAKING ROUGH-SIDED LUMBER FROM SURFACED LUMBER

BACKGROUND AND SUMMARY OF THE INVENTION

This invention relates to an apparatus which roughens the sides of surfaced lumber to give it the appearance of rough-sawn lumber, and in particular to such an apparatus which processes all four sides of the lumber simultaneously.

When lumber is made it first is cut with a saw to a size which is slightly larger than its ultimate size, and it then is surfaced with a planer, which brings it to its final dimensions. In some building applications it is aesthetically desirable to maintain the rough sawn surface texture created by sawing, and for this reason unfinished lumber is sold as rough-sawn lumber. However, this lumber is slightly larger than comparable sizes of surfaced lumber which creates alignment problems when rough-sawn and surfaced lumber is used on different sections of a structure. As a result a demand has arisen for rough-sawn lumber which has surfaced lumber dimensions.

While it certainly is possible for a lumber mill to rough saw lumber in surfaced lumber sizes, there is insufficient demand for this to be done on a regular basis. Furthermore, stocking a complete inventory of both surfaced and rough-sawn lumber would require a significant increase in storage space at all levels of distribution. Accordingly, lumber has heretofore only been sawn to surfaced lumber sizes on special order, and this is economically feasible only when large quantities of lumber are required. On smaller jobs it is necessary to resaw rough-sawn lumber to surfaced lumber dimensions, which is expensive and difficult to accomplish since all four sides must be sawn independently and each cut must be at an extremely shallow depth.

The subject invention overcomes these problems by providing an apparatus which roughens all four sides of surfaced lumber in a single pass without materially altering its dimensions and is adjustable to readily accommodate various lumber sizes. This is accomplished by mounting endless loop chains, having roughening teeth projecting from them, on a plurality of sleds which are supported on a common frame. The endless chains are supported by guide assemblies which position the roughening teeth so that they project through slots which are defined in planar faces of the sleds. Preferably, the guide assemblies are adjustable so that the roughening teeth can be centered in the slot, and the depth of cut can be adjusted. Motors drive the chains so that the roughening teeth translate across the slots and roughen the sides of a piece of lumber which is transported past the sleds.

A first pair of the sleds is positioned side by side with one another with their faces oriented vertically. One of the first sleds is fixedly attached to the frame and the other first sled is slidable on the frame relative to the fixed first sled. Thus, the distance between the faces of the first sleds can be adjusted so that the face of one of the first sleds is adjacent to each of the side surfaces of a piece of lumber as it is passed between them. A second pair of the sleds has its faces oriented horizontally. The second pair of sleds also contains both a fixed and slidable sled so that the sleds can be adjusted to contact the top and bottom surfaces of the piece of lumber as it is transported between them.

Once the sleds are adjusted so that their faces are aligned with all four sides of a piece of lumber, the lumber is inserted into the device and a transport mechanism transports it past the sleds where the roughening teeth roughen its sides. In the preferred embodiment the transport mechanism includes two pinch roller assemblies with one being located on each side of the sleds. Each pinch roller assembly includes a pair of pinch rollers which are rotatable on vertically spaced-apart horizontal axes. The upper roller in each pair is movable relative to the lower roller. Thus, the rollers can be adjusted so that a piece of lumber will be squeezed between them. The rollers in each pair are driven in synchronous counter rotation by a motor to move the lumber through the apparatus.

The lower pinch rollers are aligned with the fixed second sled and lumber guides mounted on the faces of the sleds index the piece of lumber so that it is in alignment with both fixed sleds. Support rollers associated with the second sleds carry the lumber as it is passed between the second sleds in order to prevent it from dragging on the faces and creating friction.

Accordingly, it is a principal object of the present invention to provide an apparatus which will create a rough-sawn texture on all four sides of a piece of surfaced lumber in a single pass.

It is a further object of the present invention to provide such an apparatus which can easily be adjustable to accommodate different size lumber.

It is a further object of the present invention to provide such an apparatus in which the cutting element can easily be adjusted to set the depth of cut.

It is a still further object of the present invention to provide such an apparatus which is an integral self-contained unit.

The foregoing and other objectives, features and advantages of the present invention will be more readily understood upon consideration of the following detailed description of the invention taken in conjunction with the accompanying drawings.

DETAILED DESCRIPTION OF A PREFERRED EMBODIMENT OF THE INVENTION

Figure 1:
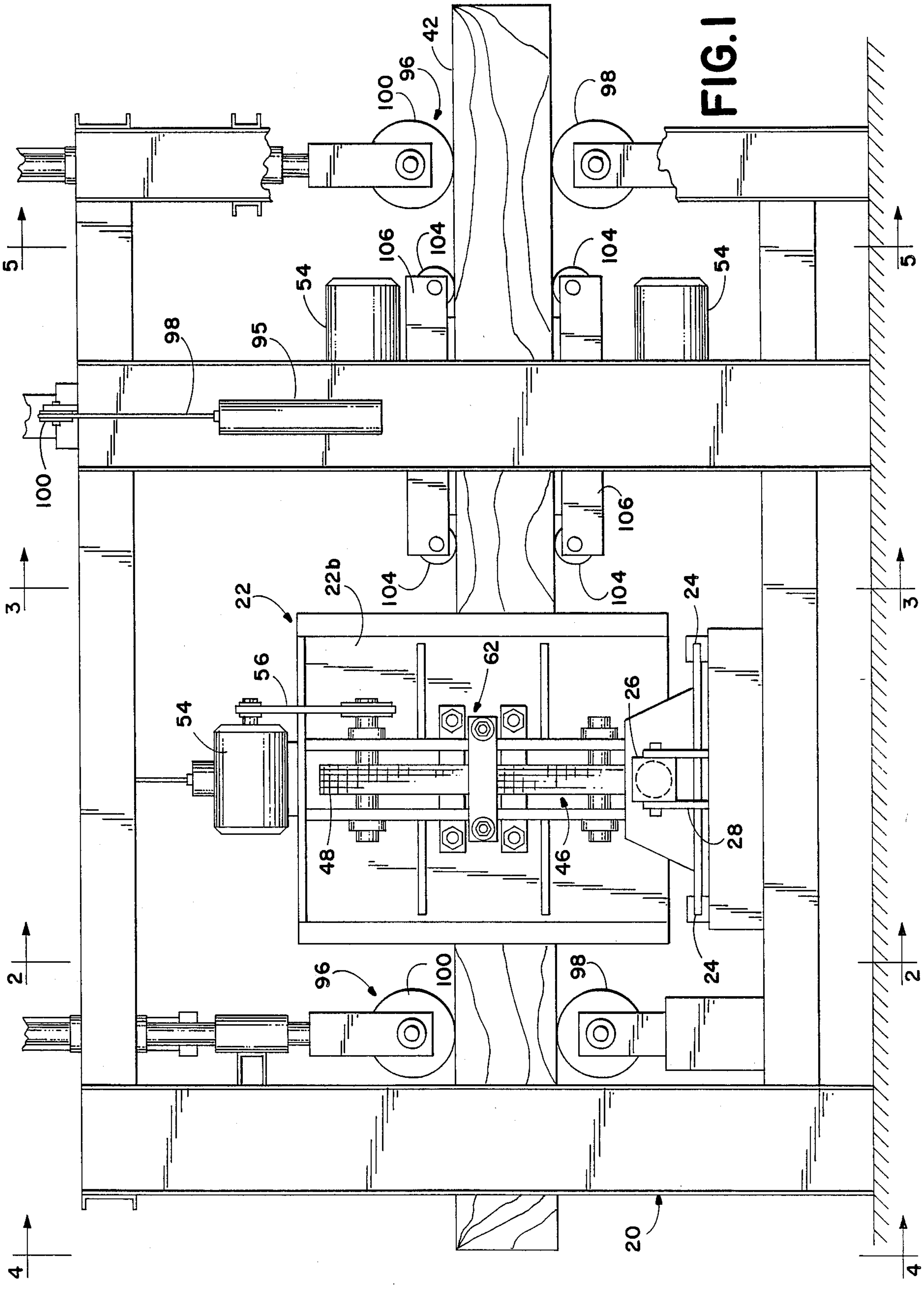
FIG. 1 is a side elevation view, partially broken away to show hidden detail, of a lumber-roughening apparatus which embodies the features of the present invention.
Figure 2:
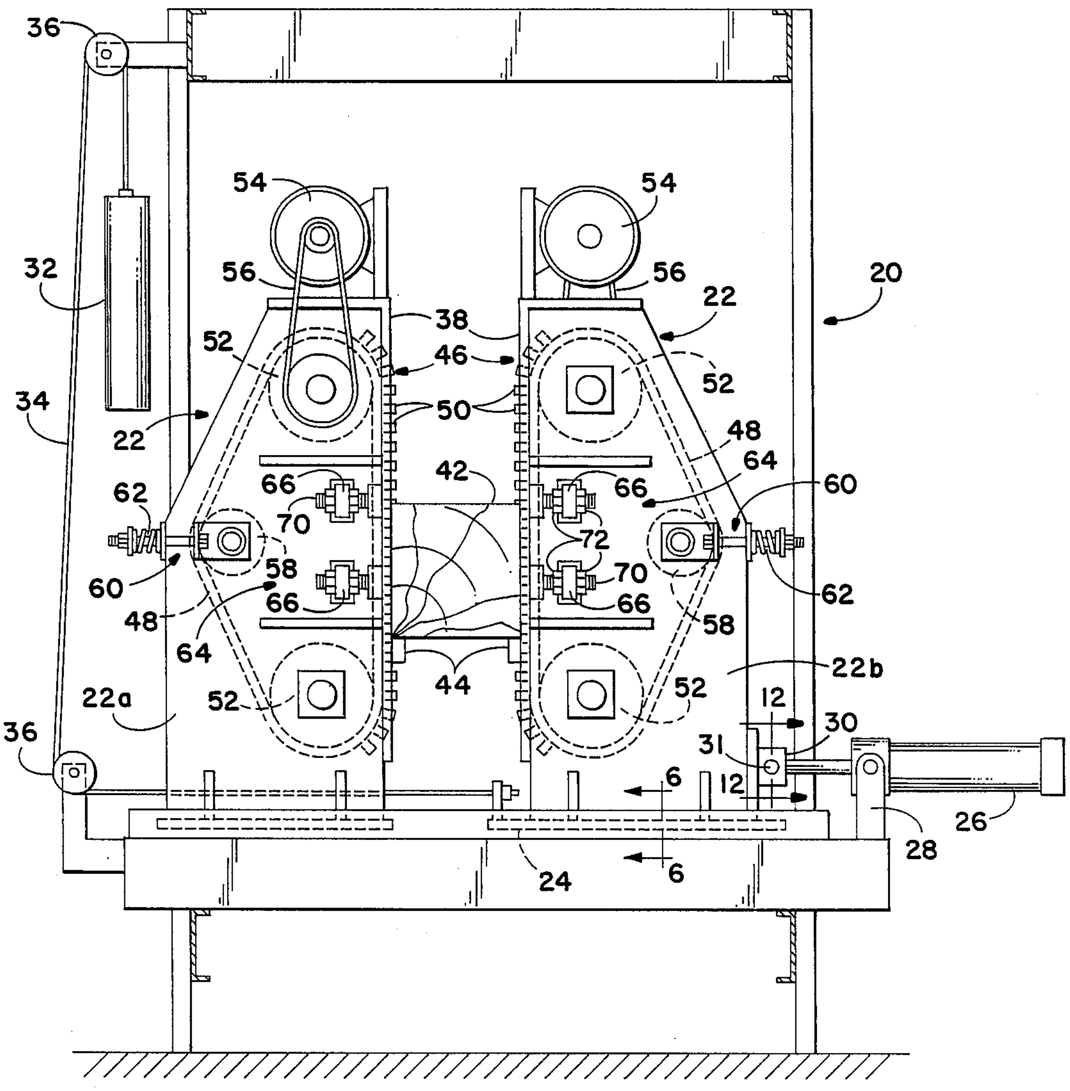
FIG. 2 is a sectional view taken along the line 2—2 in FIG. 1.
Figure 3:
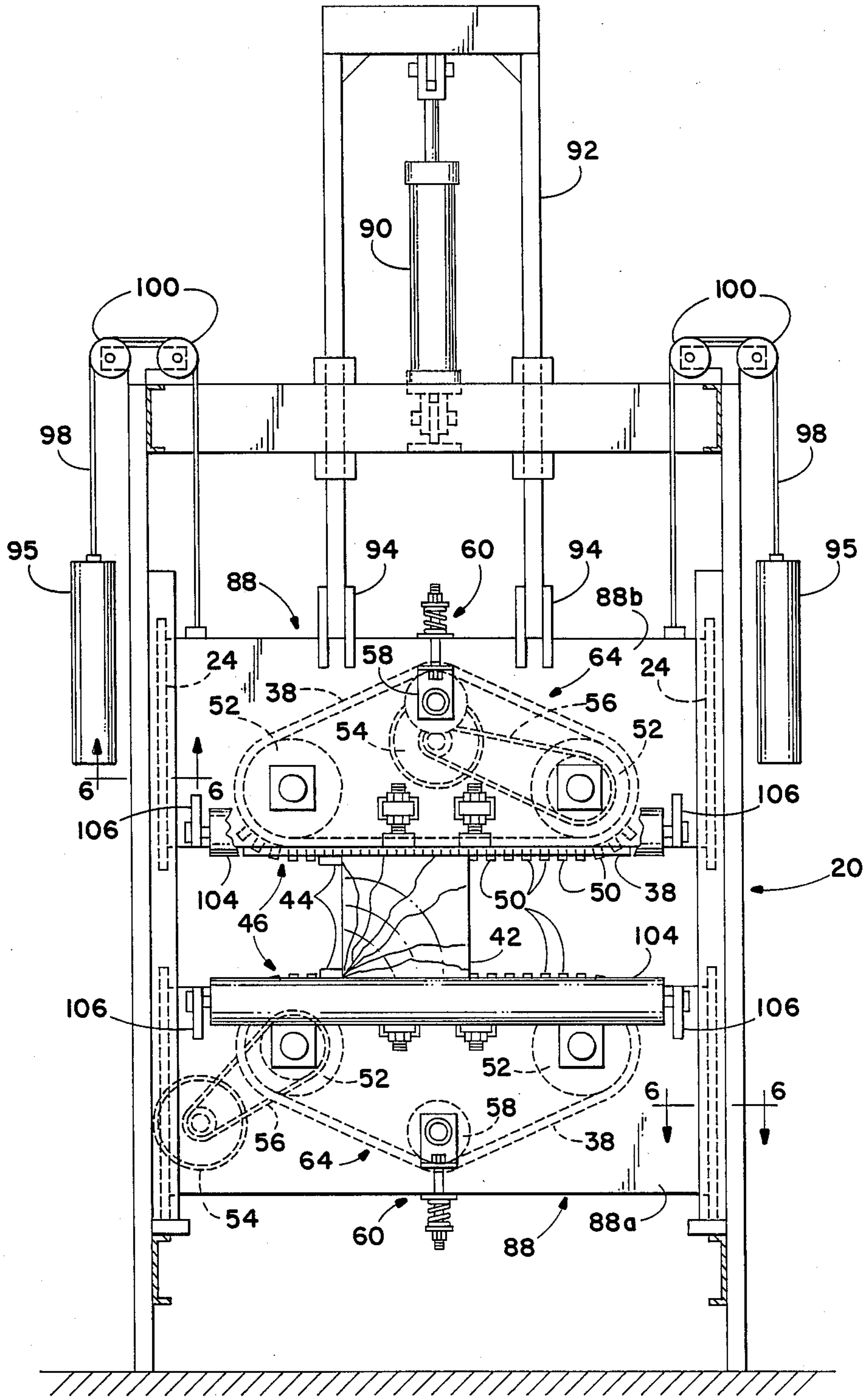
FIG. 3 is a sectional view taken along the line 3—3 in FIG. 1.
Figure 6:
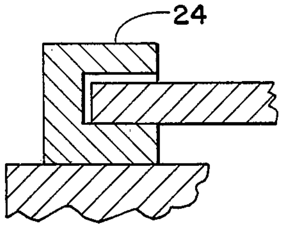
FIG. 6 is a sectional view taken along the lines 6—6 in FIGS. 2 and 3.

Referring to FIGS. 1, 2 and 3 of the drawings, the apparatus of the present invention includes an open-centered box frame 20 which supports the remaining elements of the apparatus. Looking particularly at FIG. 2, a pair of first sleds 22 is mounted on the frame 20 intermediate its ends. One of the first sleds 22a is fixed to the frame and the other first sled 22b is slidable transversely across the frame toward and away from the fixed first sled 22a. The slidable first sled 22b is mounted on a track 24, FIG. 6, which accommodates this movement. The cylinder end of a linear actuator 26 is attached to the frame 20 through a bracket 28 and the piston end is attached to the slidable first frame 22b through a clevis 30 and bolt 31. Thus, when the actuator piston is extended or retracted by means of conventional controls: and pressurized fluid, not shown, the slidable first sled is moved toward or away from the fixed first sled. The fit between the clevis 30 and bolt 31, and the fit of the track 24 are purposely constructed loose so that the slidable first sled 22 is free to move angularly about a vertical axis. A counterweight 32, which is connected to the slidable first sled through a cable 34 and pulleys 36, normally urges the slidable first sled 22a toward the fixed first sled 22b thereby permitting the linear actuator to exert greater force on the first slidable sled when it is moved in this direction than when it is moved in the other direction.

Figure 9:
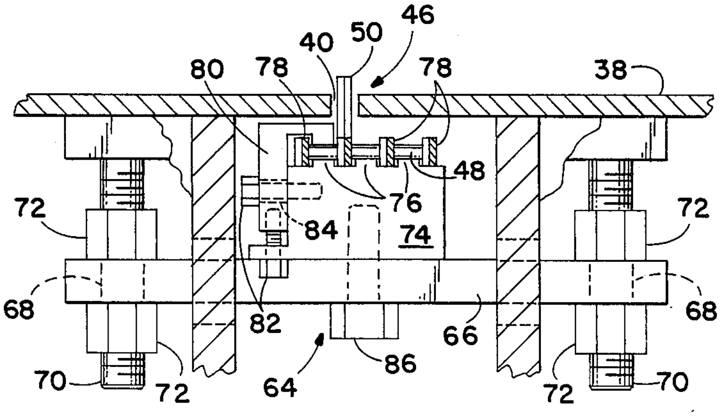
FIG. 9 is a sectional view taken along the line 9—9 of FIG. 7.
Figure 8:
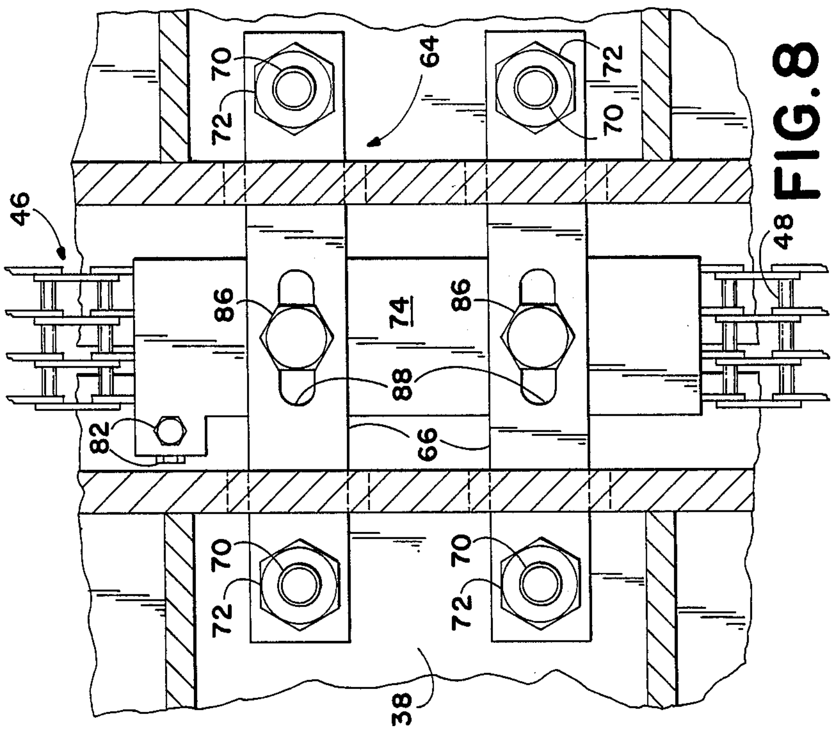
FIG. 8 is a sectional view taken along the line 8—8 of FIG. 7.
Figure 10:
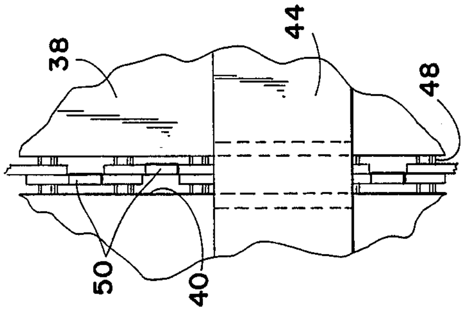
FIG. 10 is a fragmentary plan view taken along the line 10—10 of FIG. 7.
Figure 7:
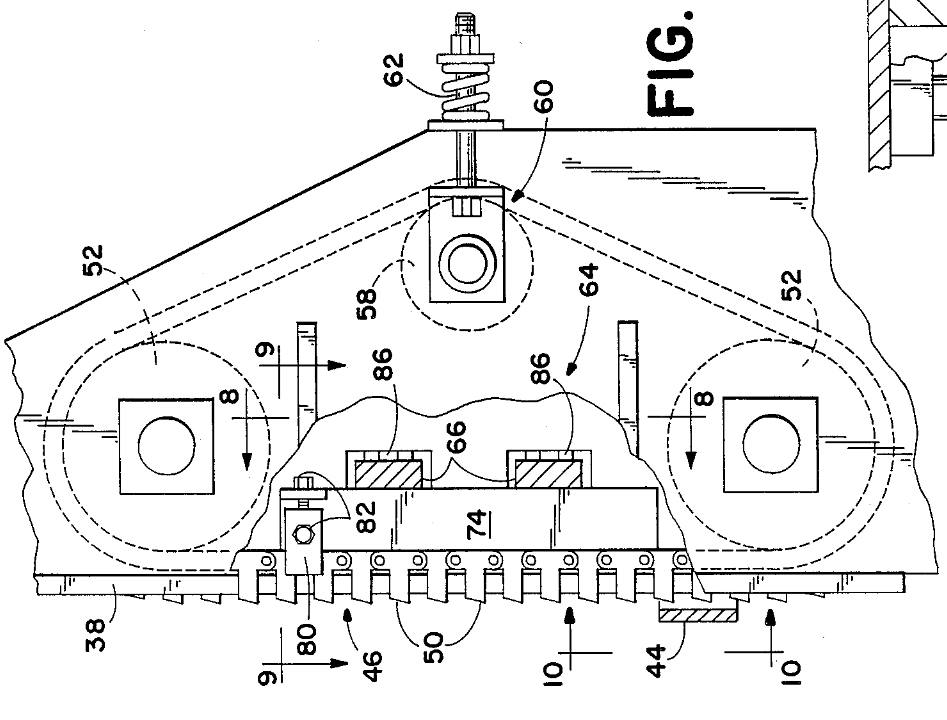
FIG. 7 is a detail view, at an enlarged scale and partially broken away, of the cutting apparatus of the subject invention.

The first sleds each have planar vertical faces 38, FIGS. 7, 8 and 9, which have elongate slots 40 extending through them. Thus, a vertical channel is defined between the faces, and the width of the channel can be varied to match the width of a piece of lumber 42 which is being processed by the apparatus by movement of the linear actuator 26. Extending horizontally across each face 28, proximate its lower edge, is an elongate lumber guide 44 which supports the lumber as it passes between the first sleds. In the embodiment illustrated the lumber guide extends across the slot 40 and thus is U-shaped in order to clear the roughening teeth 50 which extend through the slot, as will be described later.

Also located on each first sled 22 is a cutter assembly 46 which creates the rough sawn texture in one surface of the lumber. The cutter assembly includes an endless chain 48 which, in the embodiment illustrated, is three links wide. Located between two of the links are a plurality of thin roughening teeth 50 which project outwardly from one side of the chain. Chains of this type are commercially available and currently are used to create a rough sawn finish on plywood paneling. The chain is carried on a pair of drive sprockets 52 which are mounted rotatably to the sled 22 one above the other adjacent to the face 38. One of the drive sprockets is driven by a motor 54 through a drive chain 56. The chain wraps around the drive sprockets 52 and a smaller diameter idler sprocket 58, which is located midway between the drive sprockets 52 is offset away from the face 38 from them. The idler sprocket 58 is movably mounted to the sled 22 through an adjustable bracket 60 so that the distance the idler sprocket is offset from the drive sockets can be varied in order to take up slack in the chain as it wears. The bracket 60 is mounted through a spring 62 which permits a preload to be supplied to the chain.

The drive sprockets 52 are located on the sled 22 in a position which causes the roughening teeth 50 to extend through the slot 40 in the face 38 of the sled when the chain is installed on the drive sprockets. In addition, the portion of each chain which passes over its associated slot 40 is supported by a guide assembly 64 which forces the roughening teeth into the piece of lumber, establishes the depth to which the roughening teeth will cut, and allows that the roughening teeth to be centered in the slot. The guide assembly 64 comprises a pair of parallel spaced-apart guide plates 66 which extend across the slot 40. Each guide plate is attached to the sled through a pair of studs 70 which depend from the back side of the face 38 and pass through opening 68 located in each end of the guide plate. A pair of nuts 72 are threadeadly engaged onto each stud 70 on each side of the associated guide plate. When tightened against the guide plate the nuts 72 secure the guide plate to the studs as well as set the height of the guide plate above the face 38. This height sets the amount the roughening teeth project from the face and thus the depth of cut made by them. Extending between the guide plate 66 is a bearing block 74 which has grooves 76 formed in its lower surface which conforms with the links 78 of the chain 38. The bearing block extends over most, but not all, of the length of the slot and covers the entire portion of the chain where the roughening teeth are achieving any substantial cutting action on the lumber. Attached to the bearing block is a U-shaped finger 80 which fits into the opposite side of a portion of the chain and holds the chain against the bearing block 74. The finger 80 is attached to the bearing block by a pair of bolts 82, one of which fits through a slotted opening 84 in the finger. The bolts are arranged to allow the location of the finger to be adjusted relative to the bearing block in order that the finger can urge the chain into engagement with the grooves 76. The bearing block 74 is attached to the guide plate 66 by means of bolts 86 which fit through slots 88 located in the guide plates. Thus the bearing block can be positioned so that the chain is centered in the slot by loosening the bolts.

Also, located on the frame 20 is a pair of second sleds 88, FIG. 3, which are substantially the same as the first sleds 22 except that the faces 38 are horizontal rather than vertical. Thus, the faces form a horizontal channel through which the lumber travels. As with the first sleds the second sleds include a fixed second sled 88a and a slidable second sled 88b which is movable in a track 24. The second fixed sled 88a is located below the second slidable sled 88b at a level where its face is aligned with the lumber guides 44 on the first sleds. Thus, the bottom surface of lumber which is transported through the first sleds on the lumber guides 44 will be aligned with the face of the fixed second sled 88a. The slidable second sled is raised and lowered by means of a linear actuator 90 whose piston is connected to the frame 20. The piston of the actuator 90 is connected to the top leg of an inverted U-shaped bracket 92 and the legs of the bracket are connected to the slidable second sled through clevis 94. As was the case with the first sleds, the clevis 94 and the track 24 have loose fits so that the slidable second sled is free to more angularly about a horizontal axis. Counterweights 95 act through cables 98 and pulleys 100 to support the weight of the second slidable sled so that the actuator 90 does not have to raise and lower it alone.

Cutter assemblies 64 mounted on the second sleds are identical to the cutter assemblies described above for the first sleds except that the chains 38 are oriented horizontally rather than vertically when the roughening teeth are in their operative position. The lumber guides 44 which extend across the faces of the second sleds are aligned with the face of the fixed first sled 22*a* such that one side of lumber which is transported through the first sleds will be coplanar with the lumber guides 44 on the second sleds.

Figure 4:
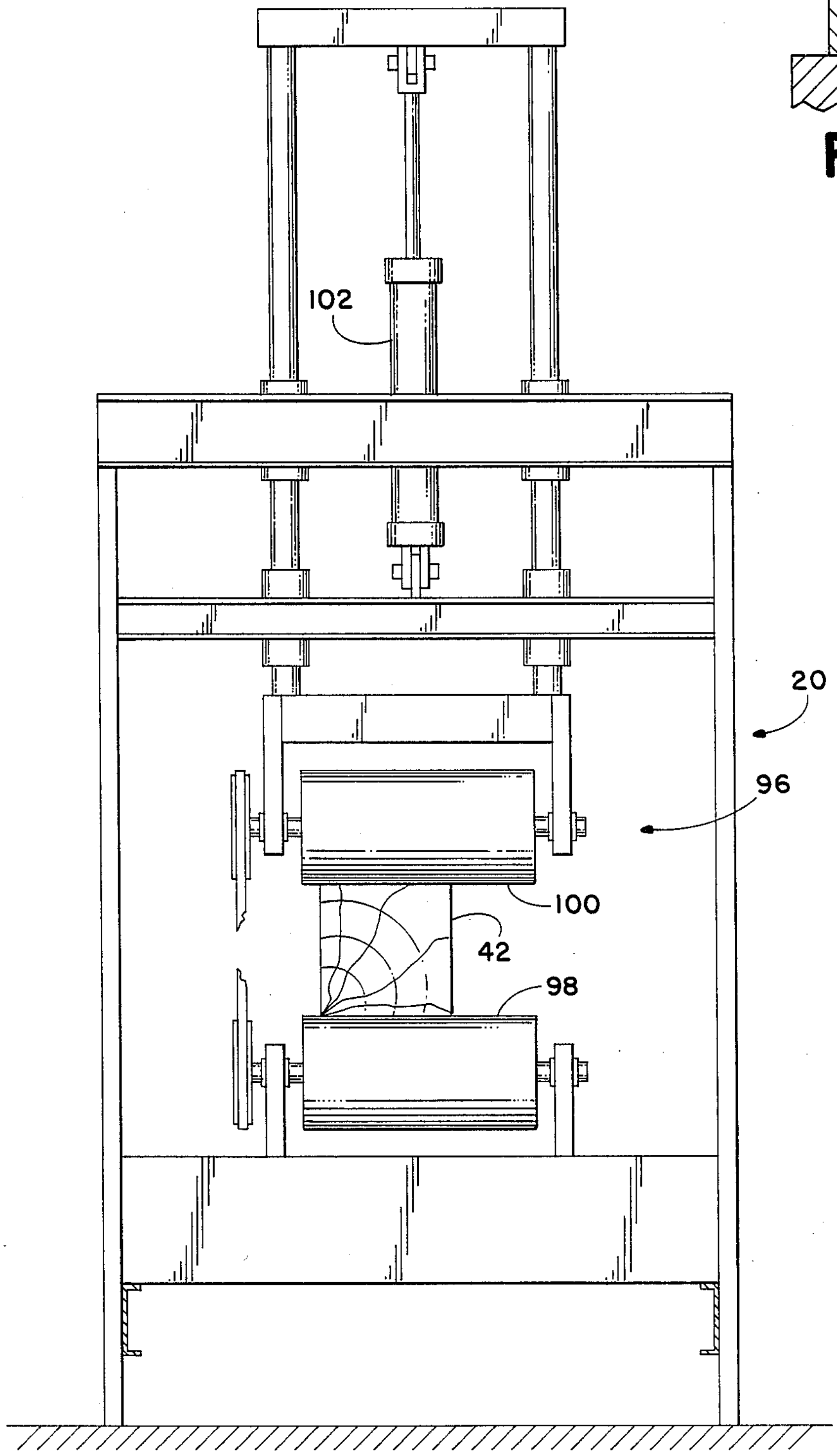
FIG. 4 is a sectional view taken along the line 4—4 in FIG. 1.
Figure 12:
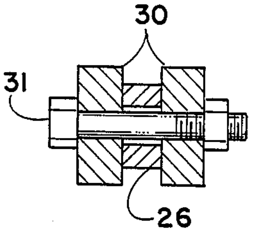
FIG. 12 is a sectional view, at an enlarged scale, taken along the line 12—12 in FIG. 2.
Figure 5:
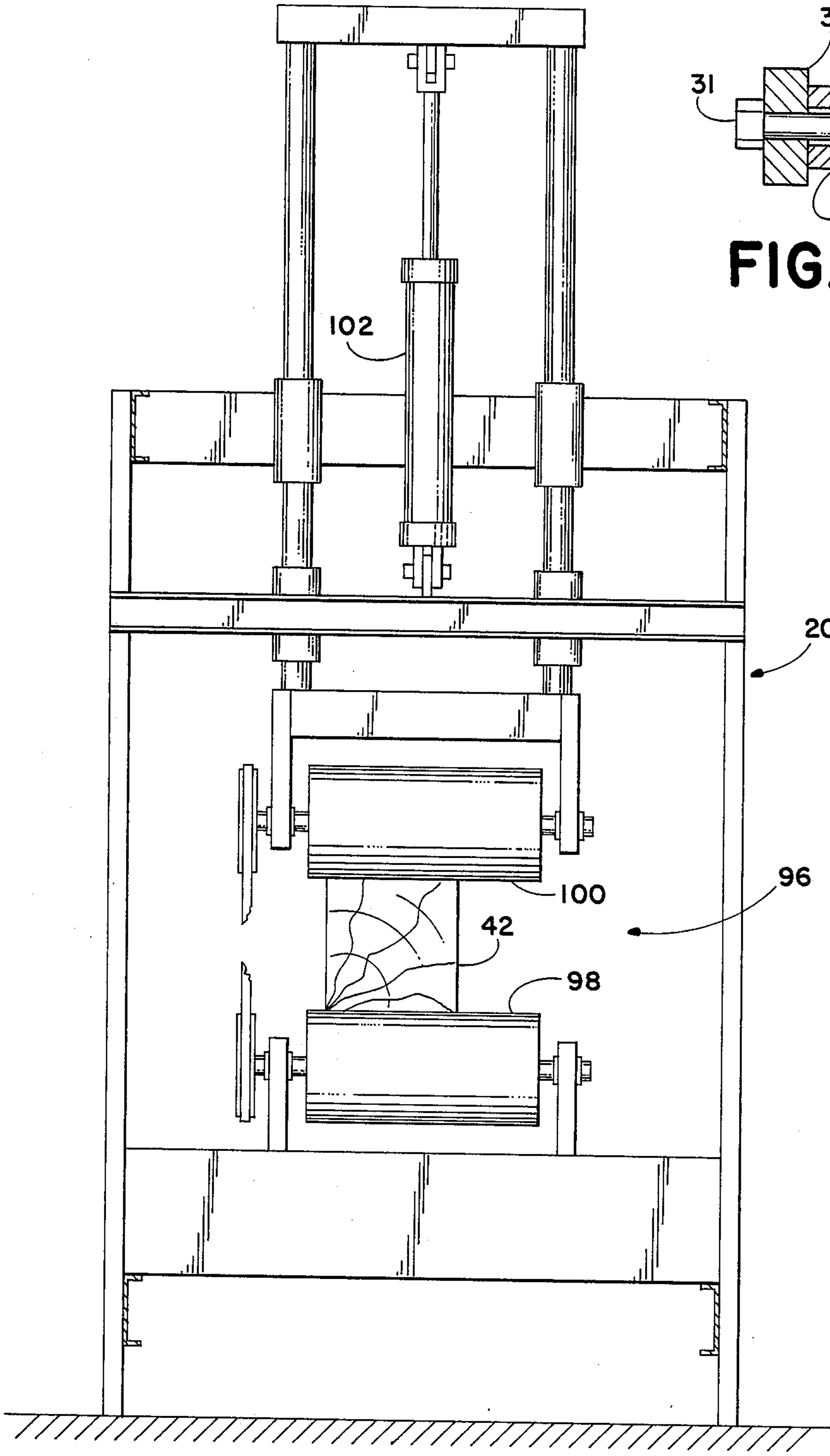
FIG. 5 is a sectional view taken along the line 5—5 in FIG. 1.

Located on each side of the first and second sleds is a powered pinch roller assembly 96 which transports lumber through the apparatus. The pinch roller assemblies, which are best seen in FIGS. 4 and 5, each comprise a lower pinch roller 98 which is rotatably mounted on the frame 20, and an upper pinch roller 100 which is mounted on ways 102 for up and down sliding movement. Linear actuators 102 are actuated by suitable controls (not shown) to raise and lower the upper pinch rollers. The upper periphery of the lower pinch roller is vertically aligned with the lumber guides 44 on the first sled and the face 38 of the fixed second sled 88*a* so that the bottom surface of the lumber will be coplanar with all of the surfaces. The top pinch roller then is adjusted to contact the top surface of the lumber so that the lumber is squeezed between the upper and lower pinch rollers. The upper and lower pinch rollers of each set are driven in synchronous counterrotation with respect to one another by a motor (not shown) and chain drive system 104. Thus the pinch rollers cause lumber which is introduced into them to be transported through the apparatus.

In order to prevent friction from impeding the progress of lumber through the second sleds 88, support rollers 104 contact the top and bottom surfaces of the lumber and prevent them from rubbing on the faces of the second sleds. The support rollers 104 are rotatably mounted on brackets 106 and are located on both sides of the second sleds.

Figure 11:
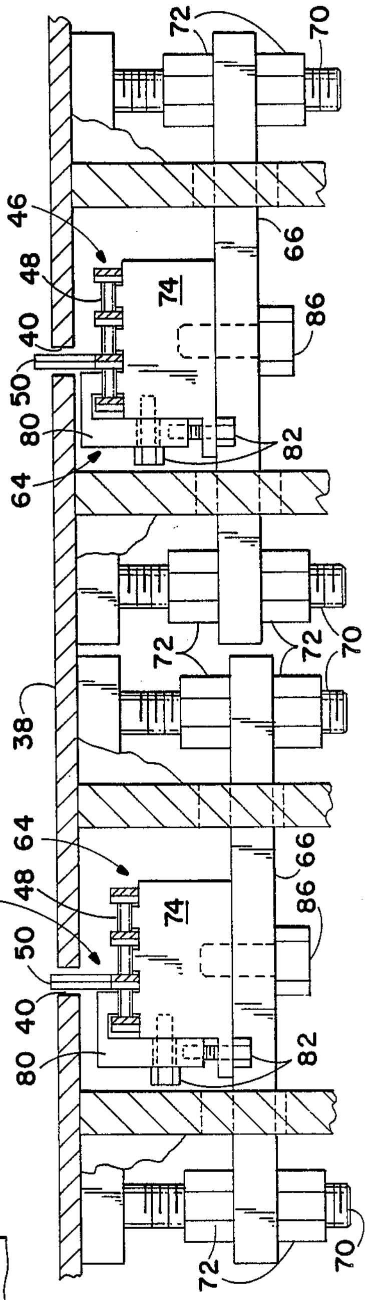
FIG. 11 is a sectional view, similar to FIG. 9, of an alternate embodiment of the invention.

In an alternate emodiment of the invention, shown in FIG. 11, there are two cutter assemblies 64, each of which carries a chain 38. In this embodiment the cutter assembly which will be first contacted by a piece of wood being transported through the apparatus is set to the same depth which would be used in the single cutter assembly embodiment. Since the roughening teeth of the second cutter assembly contacts lumber that has already been rough surfaced, it can be set to a greater depth than it could be if it were cutting virgin material. Thus, with this embodiment the overall depth of roughening is greater than with the first embodiment thereby allowing warped or irregularly surfaced lumber to be processed.

With both embodiments of the invention, the pinch rollers 98 and 100, the first sleds 22*a* and 22*b*, and the second sleds 88*a* and 88*b*, are positioned to accommodate the particular size of lumber which is to be processed by the apparatus. In the case of the sleds this setting probably will remain constant until another size of lumber is processed, since the faces 38 of the sleds do not need to bear tightly against the surfaces of the lumber. However, since the lumber is squeezed between the pinch rollers, the distance between rollers in each set must vary during the operation of the device to accommodate warped or irregular lumber. This can either be accommodated manually by the operator of the apparatus or automatically with a feedback system (not shown) which is sensitive to the pressure in the pinch roller actuators 102.

When another size of lumber is to be processed it is quick and easy to readjust the pinch rollers and the sleds to accommodate the changes. Also, as the chain wears, any slack which occurs can be removed by tightening the bracket 60 on the idler sprockets 58. As the roughening teeth 50 wear it is a simple matter to adjust their cutting depth by moving the nuts 72 lower on the studs 70. Likewise, if chain wear causes the roughening teeth of one of the cutter assemblies to become uncentered in its slot 40 in faces 38, it can be recentered by loosening the bolts 86 and moving the glide box 74 to the proper location, and then retightening the bolts 86. Finally, when the roughening teeth become dull it is a simple matter to remove the chain for resharpening by loosening the idler sprocket bracket 60 and removing the finger 80.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Apparatus for creating a surface texture resembling that of rough-sawn lumber on a piece of surfaced lumber, comprising:

(a) a pair of first sleds having faces which are parallel with one another;

(b) means for moving said first sleds relative to one another so as to change the distance between said faces;

(c) a pair of second sleds having faces which are parallel with one another and are oriented at right angles with respect to the faces of said first sleds;

(d) means for moving said second sleds relative to one another so as to change the distance between said faces;

(e) endless chains having roughening teeth projecting therefrom;

(f) guide means for mounting one of said chains movably on each of said sleds such that said roughening teeth project from at least a portion of its associated face; and (g) means for driving said chains such that said roughening teeth traverse across their associated face.

2. The apparatus of claim 1, including means for transporting a piece of lumber through said apparatus with its peripheral surfaces oriented parallel with the faces of said first and second sleds.

3. The apparatus of claim 1 wherein said apparatus includes a frame which supports the remaining elements of said apparatus and one of the sleds in each pair of sleds is fixedly attached to said frame and the other sled in each pair of sleds is slidably mounted on said frame.

4. The apparatus of claim 3, including tracks which slidably carry said other sled in each said pair.

5. The apparatus of claim 4, including linear actuation means for moving said other sled back and forth in said tracks.

6. The apparatus of claim 5, including counterweight means connected to each of the movable sleds for lessening the force required from said linear actuation means to move its associated sled.

7. The apparatus of claim 3, including means for following a limited amount of rotation of each of said movable sleds about an axis which is normal to said chain when said roughening teeth project from the face of said sled and is parallel with said face.

8. The apparatus of claim 1 wherein said guide means includes means for adjusting the depth which said teeth project from their associated face.

9. The apparatus of claim 8 wherein said faces include elongate slots which said roughening teeth project through and said guide means includes means for aligning said chain with said slot.

10. The apparatus of claim 9 wherein said guide means comprises:

(a) guide plates;

(b) a bearing block which is fixed to said guide plates and is arranged to conformingly receive the side of said chain which does not have said roughening teeth projecting therefrom;

(c) a finger associated with said bearing block which comformingly engages a portion of the other side of said chain without interfering with said roughening teeth in a manner such that said chain simultaneously bears against both said bearing block and said finger; and (d) means for attaching said guide plates to said sled.

11. The apparatus of claim 10 wherein said faces include elongate slots which said roughening teeth project through, and said means for attaching comprises:

(a) a plurality of threaded studs which depend from said sled;

(b) said guide plates having a plurality of openings extending therethrough which are aligned with said studs when said roughening teeth are aligned with said slots; and (c) a pair of nuts which are threadingly attached to each of said studs, one of said nuts being located on each side of said guide plate.

12. The apparatus of claim 2 wherein said means for transporting comprises:

(a) a pair of first pinch rollers which are rotatably mounted on parallel axes which parallel with the faces of said second sleds and normal to the direction said piece of lumber is transported through the apparatus;

(b) means for driving said pair of first pinch rollers in synchronous counterrotation rotation relative to one another;

(c) means for moving said pair of first pinch rollers relative to one another so as to change the distance between their axes;

(d) a pair of second pinch rollers which are rotatably mounted on parallel axes which are parallel with the faces on said second sleds and normal to the direction said piece of lumber is transported through the apparatus;

(e) means for driving said pair of second pinch rollers in synchronous counterrotation rotation relative to one another;

(f) means for moving said pair of second pinch rollers relative to one another so as to change the distance between their axes;

(g) wherein said first and second sleds are located side by side between said first and second pinch rollers.

13. The apparatus of claim 2, including a plurality of support rollers having axes which are parallel with the faces of said second sleds, and normal to the direction said piece of lumber is transported through the apparatus, one of said support rollers being located on each side of each of said second sleds and the peripheries of said support rollers projecting beyond the faces of said second sleds by an amount which is less than the amount said roughening blades project from said faces.

14. The apparatus of claim 1 wherein there are two of said guide means and two of said chains associated with each of said sleds.

15. An apparatus for creating a surface texture resembling that of rough-sawn lumber on a piece of surfaced lumber comprising:

(a) means for transporting a piece of lumber along its elongate axis through said apparatus;

(b) a plurality of moving teeth means, for roughening all four sides of said piece of lumber (c) means for moving at least a portion of said teeth means toward and away from said piece of lumber in order to allow different size pieces of lumber to be processed on said apparatus.

16. Apparatus for creating on surfaced lumber a surface texture resembling that of rough-sawn lumber comprising:

(a) a plurality of endless chains having roughening teeth projecting therefrom;

(b) a plurality of sleds;

(c) guide means mounted on each of said sleds for guiding one of said chains;

(d) means for supporting each of said sleds in a predetermined location;

(e) means for moving of lumber past said plurality of chains;

(f) means for driving each of said chains with respective ones of the roughening teeth thereof contacting a respective side of piece of lumber as it is moved past said plurality of chains, so as to provide the appearance of rough-sawn lumber on each of a plurality of sides with a single pass of said piece of lumber past said plurality of chains.

17. The apparatus of claim 15, including means for moving said sleds so as to bring said roughening teeth of each chain into contact with a respective surface of a piece of lumber being passed through said machine.

18. The apparatus of claim 16, including counterweight means for assisting in positioning said sleds.

19. The apparatus of claim 16 wherein said means for moving includes a fluid-operated cylinder and piston combination.

20. The apparatus of claim 15 wherein said chain is a roller chain having at least three plates, each of said roughening teeth being attached to an interior one of said plates.

21. The apparatus of claim 15 wherein said means for moving a piece of lumber includes motor means for moving respective pinch rollers into contact with the surfaces of said piece of lumber.

22. The apparatus of claim 15 wherein said sleds are arranged in opposed pairs, one of each pair being movable toward the other in order to process opposite surfaces of pieces of lumber of various size.

* * * * *

UNITED STATES PATENT AND TRADEMARK OFFICE

CERTIFICATE OF CORRECTION

PATENT NO. : 4,844,134

DATED : July 4, 1989

INVENTOR(S) : Alan C. Martindale

It is certified that error appears in the above-identified patent and that said Letters Patent is hereby corrected as shown below:

| | |
|---|---|
| Col. 3, line 23 | After "controls" delete --:-- |
| Col. 7, line 50 | After "counterrotation" delete --rotation-- |
| Col. 7, line 62 | After "counterrotation" delete --rotation-- |
| Col. 8, line 21 | After "lumber" insert --;-- |
| Col. 8, line 45 | Change "15" to --16-- |
| Col. 8, line 54 | Change "15" to --16-- |
| Col. 8, line 58 | Change "15" to --16-- |
| Col. 8, line 62 | Change "15" to --16-- |

Signed and Sealed this

Thirty-first Day of March, 1992

*Attest:*

HARRY F. MANBECK, JR.

*Attesting Officer*

*Commissioner of Patents and Trademarks*